P. UGALDEA AND F. MADINABEITIA.
VEHICLE WHEEL.
APPLICATION FILED FEB. 16, 1920.

1,409,624.

Patented Mar. 14, 1922.
5 SHEETS—SHEET 1.

Inventors:
Pantaleon Ugaldea, Federico Madinabeitia,
By their Attorney
Geo. Wm Miatt.

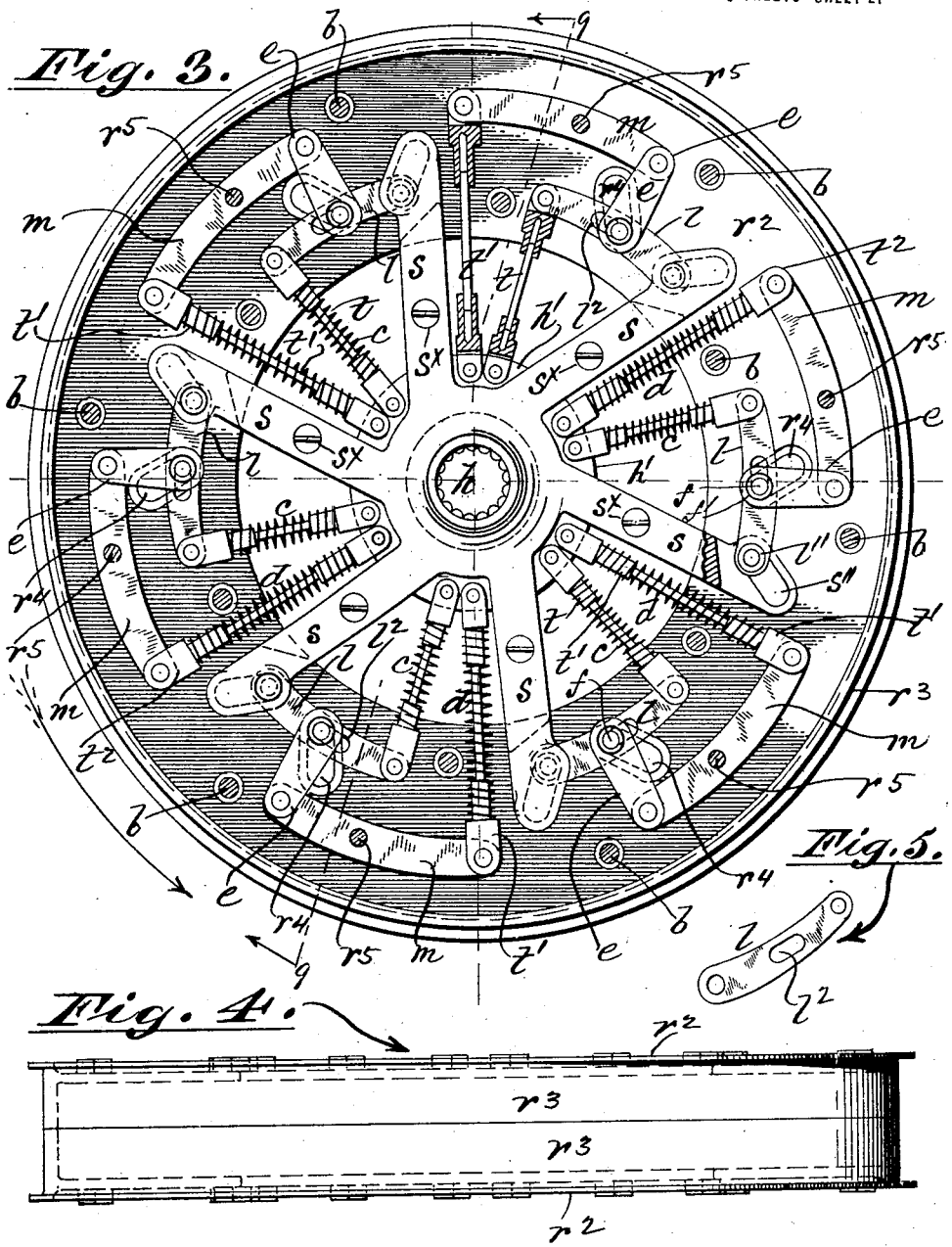

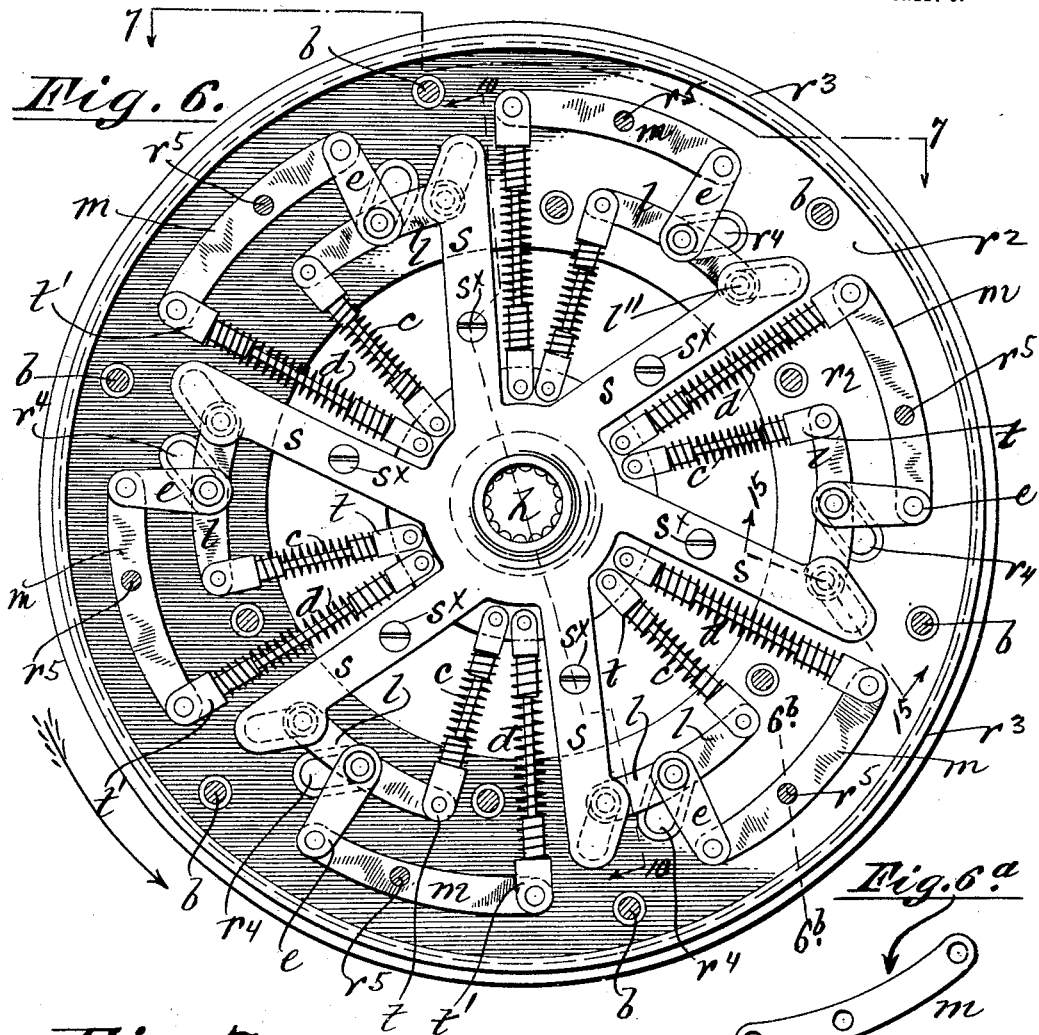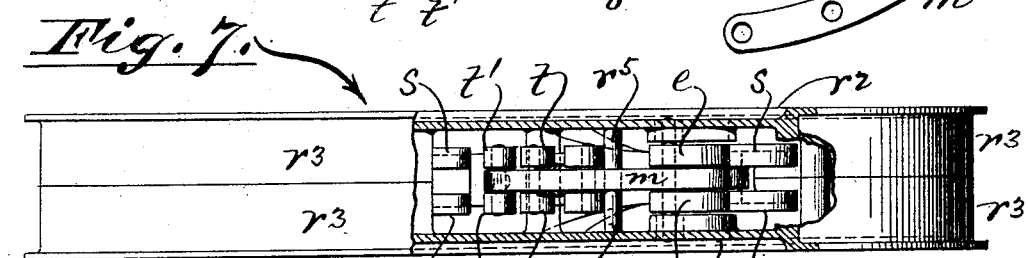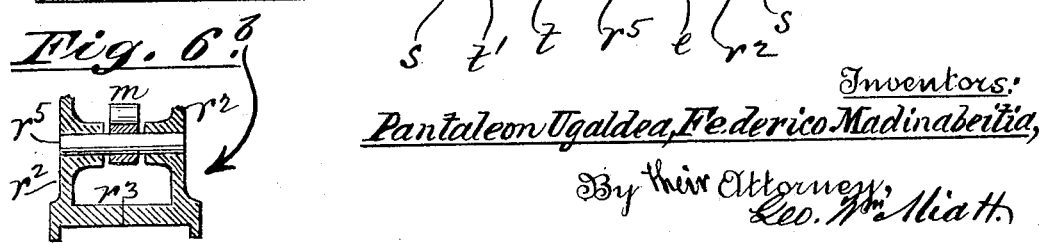

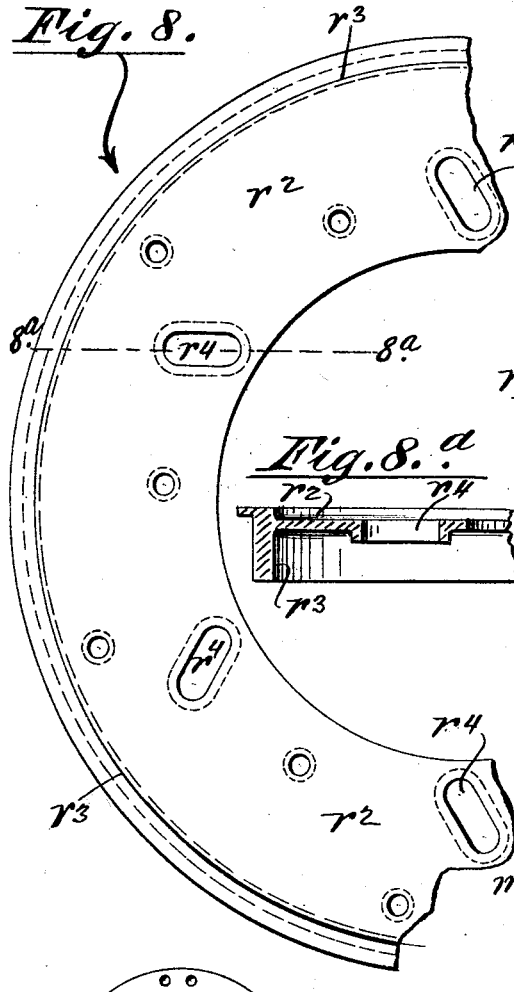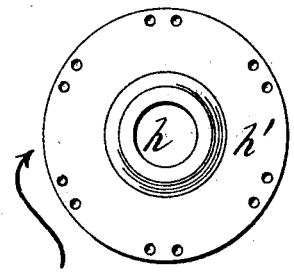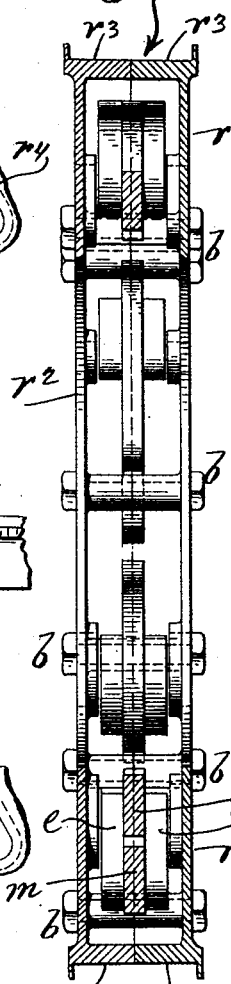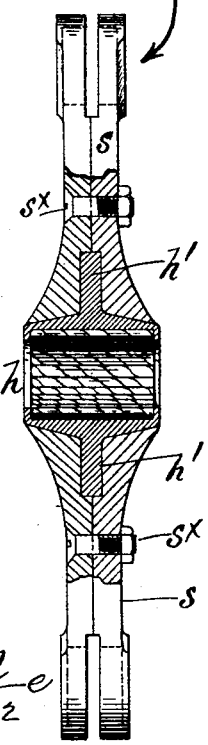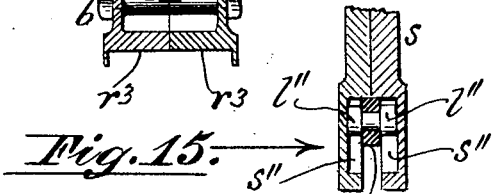

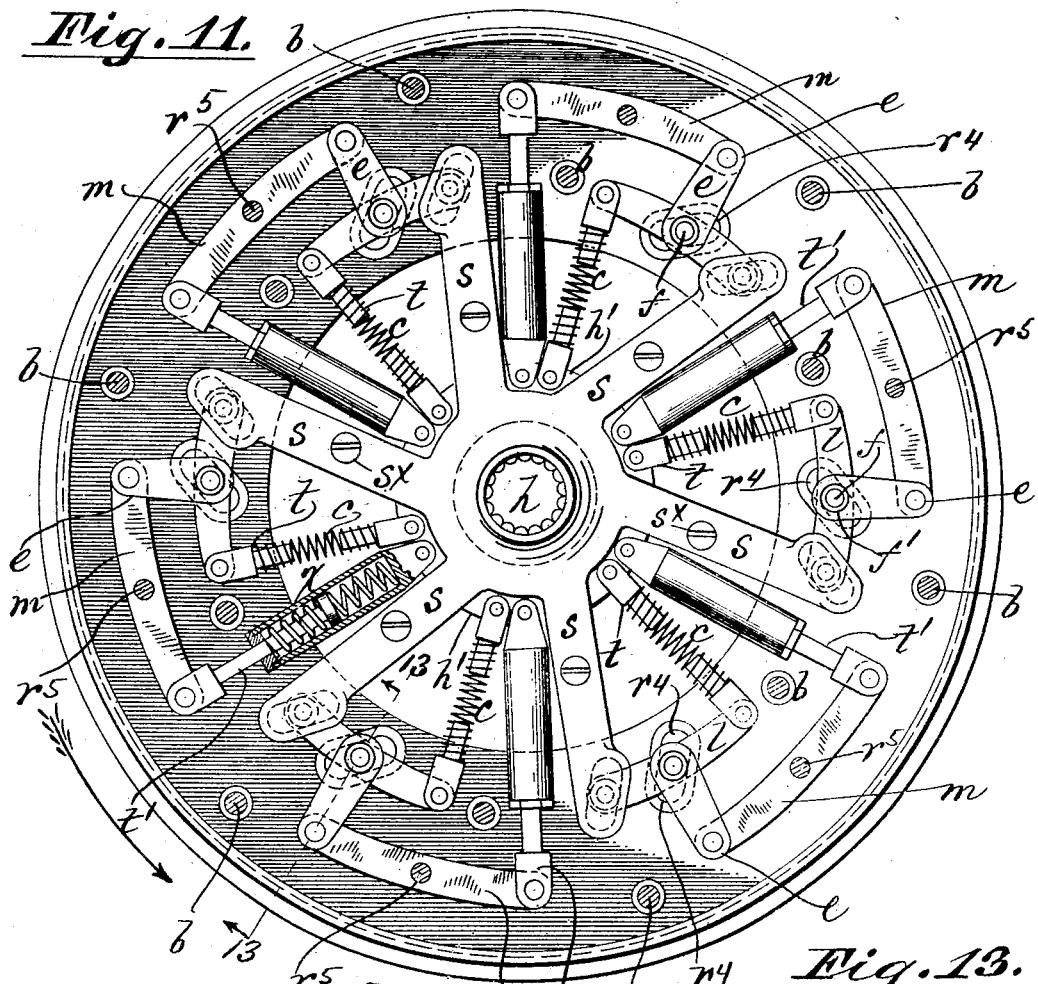

UNITED STATES PATENT OFFICE.

PANTALEON UGALDEA, OF BROOKLYN, AND FEDERICO MADINABEITIA, OF NEW YORK, N. Y.

VEHICLE WHEEL.

1,409,624.  Specification of Letters Patent.  Patented Mar. 14, 1922.

Application filed February 16, 1920. Serial No. 358,967.

*To all whom it may concern:*

Be it known that we, PANTALEON UGALDEA, a subject of the King of Spain, and a resident of the borough of Brooklyn, county of Kings, and city and State of New York, and FEDERICO MADINABEITIA, a subject of the King of Spain, (having declared his intention of becoming a citizen of the United States,) and a resident of the borough of Manhattan, city, county, and State of New York, have invented certain new and useful Improvements in Vehicle Wheels, of which the following is a specification.

Our invention relates to vehicle wheels generally, and particularly to traction wheels sustaining the vehicle load.

Our invention consists in the specific construction and arrangement of parts described and claimed, whereby the load weight upon the wheel axle tends constantly to advance the hub of the wheel beyond the axial centre of the rim, which is secured to the hub and the spokes thereof by elastic resilient means interposed between said hub and rock levers fulcrumed on the rim, as hereinafter fully set forth.

Incidentally the elastic resilient support thus afforded to the "floating" hub and spokes absorbs and neutralizes rough road shock and renders the vehicle light of draft and of smooth running quality.

In the accompanying drawings,

Fig. 3, is an elevation of the inner operative portions of a wheel (one side rim flange of which is removed) constructed in accordance with our invention, and showing a duplex arrangement of adjustage rock levers and compensative springs interposed between rim, hub and spokes;

Fig. 4, is a peripheral view of the wheel shown in part in Fig. 3;

Fig. 5, is a detail view of one of the rock levers;

Fig. 6, is a view similar to Fig. 3, but showing a modification in the arrangement of the fulcrum slots, &c;

Fig. 6$^a$, is a detail view of one of the primary adjustage rock levers shown in Figs. 6 and 11;

Fig. 6$^b$, is a section upon plane of line 6$^b$, 6$^b$, Fig. 6;

Fig. 7, is a peripheral view and section taken upon plane of line 7—7, Fig. 6;

Fig. 8, is an elevation of a portion of the outer side of one of the annular rim plates;

Fig. 8$^a$, is a transverse section taken upon plane of line 8$^a$—8$^a$, Fig. 8;

Fig. 9, is a central sectional elevation of the rim plates, &c., with the hub, spokes and springs omitted;

Fig. 10, is a sectional elevation of the hub and spokes, taken upon plane of line 10—10, Fig. 6;

Fig. 11, is a view similar to Fig. 3, showing another modification in the arrangement of cushion springs, rock levers, etc.;

Fig. 12, is a detail of one set of adjustage levers and compensating springs, of the arrangement illustrated in Fig. 3, showing the relative positions assumed thereby under load stress;

Fig. 13, is a transverse section taken upon plane of line 13—13, Fig. 11;

Fig. 14, is a side view of the hub member;

Fig. 15, is a sectional detail of the outer end of one of the spokes, taken upon plane of line 15—15, Fig. 6.

Figure 1:
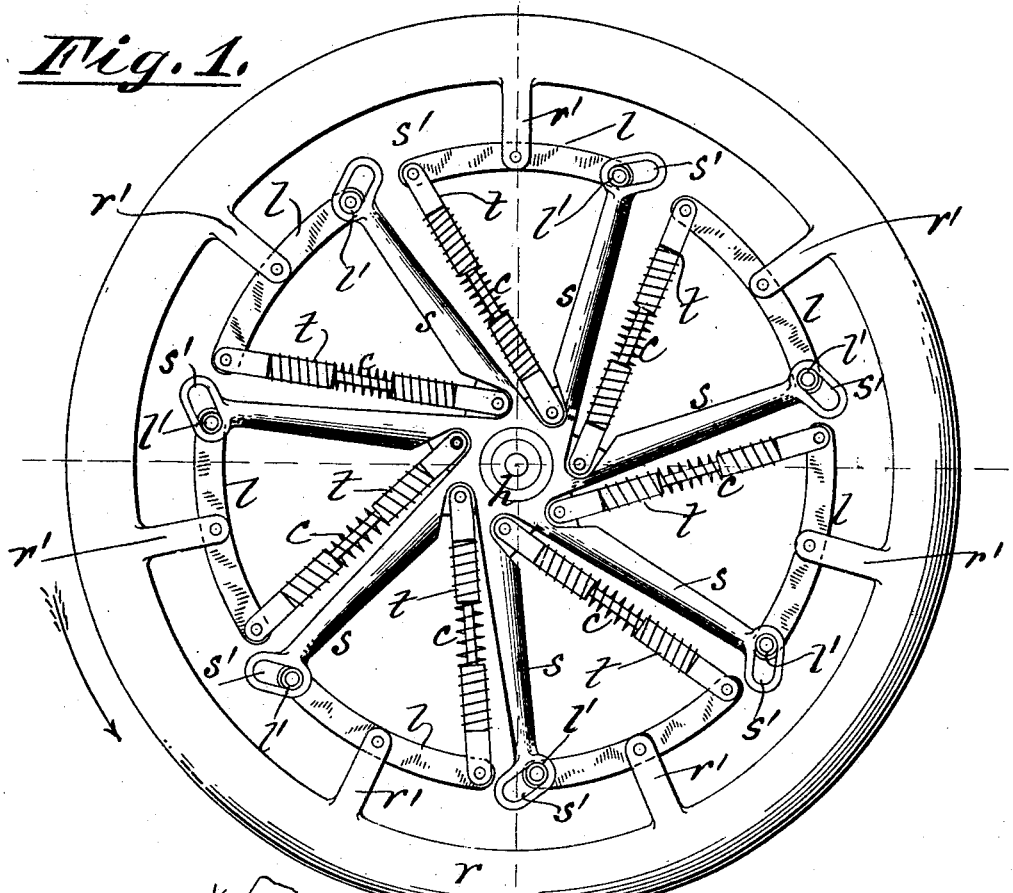
Fig. 1, is a side elevation of our new vehicle wheel in its simpler form, with a single rock lever for each spoke fulcrumed on the rim and connected with the hub section by a single spring, the wheel being shown at rest and without load.
Figure 2:
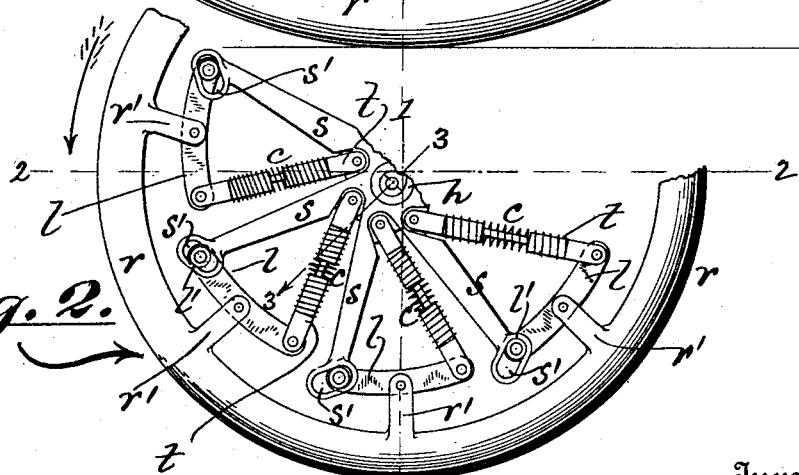
Fig. 2, is a side elevation on a smaller scale, of a portion of the wheel represented in Fig. 1, shown under stress of load.

In Figures 1 and 2 the spokes $s$, $s$, are made integral with the hub $h$, and their outer extremities are formed each with a tangential loop $s'$, for the reception of a bearing roller $l'$, mounted on one extremity of an adjustage rock lever $l$, one such rock lever $l$, being provided for each spoke $s$, and each rock lever $l$, being independently fulcrumed on an extension $r'$, of the rim $r$, of the wheel.

Interposed between the hub $h$, and the other extremity of each adjustage rock lever $l$, and pivotally connected with both of said parts, is a telescopic support $t$, for a coiled compensative spring $c$, which adapts itself to the load strain imposed upon the hub $h$,—the operation of the adjustage rock lever $l$, and the compensative spring $c$, being co-related and automatic, and tending constantly to lower and advance the axis of the hub $h$, as related to the vertical plane of contact of the lowest portion of the rim $r$, with the ground, as illustrated diagrammatically in Fig. 2, in which 1 represents the vertical plane of rim contact, 2, the normal horizontal plane and height of the axis of the hub $h$, without load, and 3, the medial line of hub deflection under stress of load.

It will thus be obvious that, under such conditions of load stress, the axle of the hub $h$, is advanced beyond the axial centre of the rim $r$.

In this connection it is to be noted that the tangential loops $s'$, on the outer ends of the spokes $s$, function in allowing the adjustage rock levers $l$, to adapt themselves to the stress of load, and to transmit the same to the compensative springs $c$.

In the modifications shown principally in Figures 3, 6, and 11, and the views auxiliary thereto, substantially the same result is attained by a duplex system of adjustage rock levers and compensative springs, the main difference being that greater flexibility and eccentricity of hub support is thereby attained as compared with the simpler arrangement of parts exemplified in the first two figures of the drawings.

Thus, in each of three said Figures 3, 6 and 11, the primary adjustage rock lever $l$, in each spoke set is supplemented by a secondary adjustage rock lever $m$, and the primary compensative spring $c$, by a secondary compensative spring $d$.

In all of said latter views the operative parts are mounted between annular rim plates $r^2$, $r^2$, formed with coincidental tire flanges $r^3$, $r^3$, which constitute the seat for the wheel tread,—said annular rim plates $r^2$, $r^2$, being spaced apart and bolted together, as at $b$, $b$.

The floating hub $h$, and spokes $s$, $s$, are united integrally as shown more particularly in Fig. 10, the hub being formed with a central annular flange $h'$, and the spokes $s$, being formed in half sections, screw-bolted together, as at $s^x$, $s^x$, the resultant outer ends being bifurcated to straddle one end of a primary adjustage rock lever $l$, and being loop-recessed, as at $s''$, to receive the bearing rollers $l''$, on said straddled end of a rock lever $l$, as shown more particularly in Fig. 15.

To the annular flange $h'$, of the hub $h$, are pivotally attached the inner ends of the telescopic supports $t$, $t'$, for the compensative springs $c$, $d$.

In the arrangement shown in Fig. 3, the primary compensative rock levers $l$, are formed with medial longitudinal slots $l^2$, through which the fulcrum rods $f$, $f$, extend, said fulcrum rods $f$, $f$, being provided with end rollers $f'$, $f'$, which protrude into tangential slots $r^4$, $r^4$, formed for the purpose in the rim plates $r^2$, $r^2$, as shown more particularly in Fig. 13, of the drawings, in which case however, the section being taken upon plane of line 13—13, Fig. 11, the primary compensative rock levers $l$, have no medial slots $l^2$, the fulcrum rods $f$, $f$, simply extending through said levers.

In either case the sides of the tangential slots $r^4$, $r^4$, guide and support the ends of the fulcrum rods $f$, $f$, while allowing the primary compensative rock levers $l$, to adapt themselves to the stress of load.

As in Figures 1 and 2, so in the several modifications, one extremity of each primary compensative rock lever $l$, is pivotally connected by a telescopic spring support $t$, with the flange $h'$, of the hub $h$, while the other extremity of said primary compensative lever $l$, is provided with bearing rollers $l''$, $l''$, for engagement with tangential loops $s''$, $s''$, in the outer end of each spoke $s$, as shown in Fig. 15.

Each secondary compensative rock lever $m$, is pivotally connected at one extremity with a fulcrum rod $f$, by means of links $e$, $e$, each of said secondary compensatory rock levers $m$, being mounted in turn upon a relatively fixed fulcrum $r^5$, in the sense that said fulcrum $r^5$, is permanently positioned upon and between the rim plates $r^2$, as shown in Fig. 6$^b$. The other extremity of each secondary compensative rock lever $m$, is pivotally connected to the outer end of one of the secondary telescopic supports $t'$.

The compensative springs $c$, and $d$, may be of different relative proportions and compressive strength, as may be found most expedient in adapting our invention to the varying requirements of vehicles of all classes, so that we do not limit ourselves in this respect, the construction and arrangement of parts shown herein being merely by way of exemplification of the principle involved, which is that of a floating hub and spokes attached to the rim by elastic resilient leverage means,—the leverage functioning to utilize the stress of load on the hub to advance the latter in the direction of travel beyond the axis of the rim,—or in other words, to create an eccentricity of relation between rim and hub.

In the modification shown in Fig. 11, the main difference, as compared with the other modifications, is in the form of secondary compensative spring $d$, used, a duplex spring being employed for the purpose, acting on opposite sides of a piston head as shown at $x$, in said Fig. 11.

In any and all these exemplifications, the compensative springs not only receive and transmit the stress of load as imparted to them by the adjustage rock levers, but they also absorb and neutralize the shock of contactual tire engagement with road inequalities and obstructions, so that the vehicle thus equipped is less subject to jar and retardation,—the compensative springs, functioning as a reserve force that tends constantly to overcome resistance to progress.

It is to be noted in this connection that the spokes, as they descend in the direction of transit, act exclusively against the forward ends of the adjustage rock levers to transmit the load stress to the compensative springs which latter, when past the vertical axial plane, and as they progress upward, exert their expansive force against the hub in such manner as to thrust it forward in the direction of transit, and to maintain its eccentricity as related to the rim of the wheel.

It will thus be seen that a distinctive feature of our invention is the suspension of hub and spokes upon and within the rim by elastic resilient means, whereby the stress of load results in eccentricity of relationship between hub and rim.

What we claim as our invention and desire to secure by Letters Patent is,

1. A vehicle wheel of the character designated, comprising a floating hub, spokes rigid therewith, a rim, telescopic members pivotally connected with the hub, adjustive rock levers pivotally supported from the rim and pivotally connected to said members, and a loose connection between said spokes and levers.

2. A vehicle wheel of the character designated, comprising a floating hub, spokes rigid therewith, a rim, telescopic members pivotally connected with the hub, adjustive rock levers pivotally supported from the rim and pivotally connected to said members, a loose connection between said spokes and levers at one end, and cooperative springs interposed between the other ends of said levers and the hub.

3. A vehicle wheel of the character designated, comprising a floating hub, spokes rigid therewith, a rim, telescopic members pivotally connected with the hub, adjustive rock levers pivotally connected to said members, and a loose connection between said spokes and levers, said levers being fulcrumed between their ends from the rim.

4. A vehicle wheel of the character designated, comprising a floating hub, spokes rigid therewith, a rim, telescopic members pivotally connected with the hub, adjustive rock levers pivotally connected to said members, a loose connection between said spokes and levers at one end, and cooperative springs interposed between the other ends of said levers and the hub, said levers being fulcrumed between their ends from the rim.

5. A vehicle wheel of the character designated, comprising floating hub and spokes, a rim, duplex sets of adjustage levers fulcrumed on said rim and engaging with said spokes, and duplex sets of compensative springs interposed between and connected with said hub and said adjustage levers, for the purpose described.

6. A vehicle wheel comprising a floating hub, spokes rigid therewith, a rim, telescopic members pivoted to the hub, adjustable levers pivotally connected to said members and pivotally connected with the rim, and a loose connection between said spokes and levers.

7. A vehicle wheel comprising a floating hub, spokes rigid therewith, a rim, telescopic members pivoted to the hub, adjustable levers pivotally connected to said members, and a loose connection between said spokes and levers, said levers being pivotally mounted on the rim intermediate their ends.

8. A vehicle wheel comprising a floating hub, spokes rigid therewith, a rim, telescopic members pivoted to the hub, adjustable levers pivotally connected to said members and pivotally connected with the rim, and a loose connection between said spokes and levers, said spokes being disposed at an inclination to the radial line through the hub.

PANTALEON UGALDEA.
FEDERICO MADINABEITIA.

Witnesses:
Geo. Wm. Miatt,
Lillia Miatt Carter.